(12) United States Patent
Yang

(10) Patent No.: US 6,519,345 B1
(45) Date of Patent: Feb. 11, 2003

(54) DOUBLE-FUNCTIONED HAND-FREE DEVICE FOR CELLULAR TELEPHONE

(76) Inventor: Chin-Hui Yang, No. 139, Pai-Liu Street, Chi-Tu Dist., Keelung (TW)

( * ) Notice: Subject to any disclaimer, the term of this patent is extended or adjusted under 35 U.S.C. 154(b) by 340 days.

(21) Appl. No.: 09/636,768

(22) Filed: Aug. 14, 2000

(51) Int. Cl.⁷ .............................................. H04R 25/00
(52) U.S. Cl. ........................ 381/151; 381/326; 381/380
(58) Field of Search ................................. 381/151, 326, 381/380, 190, 355, FOR 130; 379/430, 433.02, 433.03

(56) References Cited

U.S. PATENT DOCUMENTS 2,463,786 A * 3/1949 Lybarger .................... 381/151
2,678,973 A * 5/1954 Newman .................... 381/151
5,778,079 A    7/1998 Wun
6,141,427 A * 10/2000 Fukuda ....................... 381/151
6,389,140 B1 * 5/2002 Wei ............................. 381/326

* cited by examiner

Primary Examiner—Curtis Kuntz
Assistant Examiner—Suhan Ni
(74) Attorney, Agent, or Firm—Birch, Stewart, Kolasch & Birch, LLP

(57) ABSTRACT

A double-functioned hand-free device for cellular telephone comprises a microphone casing having one end connected with a neck hanger, wherein a direct sound-receiver circuit and a circuit for sensing vibration of vocal cords are housed in the microphone casing; and a slew cover on the microphone casing is provided for control and switch the circuits alternatively to meet on-the-spot requirements.

2 Claims, 5 Drawing Sheets

DOUBLE-FUNCTIONED HAND-FREE DEVICE FOR CELLULAR TELEPHONE

BACKGROUND OF THE INVENTION

A suspended microphone for cellular telephone disclosed in a mono-functioned U.S. Pat. No. 5,778,079 shown in FIG. 1 is used to sense vibration of a user's vocal cords during vocal communication. The sensed vibration is then forwarded to a processing circuit for amplification via a spring. In this case, the spring, as a transmission medium, has a considerable open space with a limited transmission capability that could distort fidelity and weaken vibration amplitude of vocal cords to indistinguishable degree occasionally.

In view of abovesaid imperfection, the inventor of this invention is to provide an improved mechanism pertaining to the subject matter in the hope that it would be helpful in some respects to people's daily living.

SUMMARY OF THE INVENTION

The primary object of this invention is to provide a double-functioned hand-free device for cellular telephone, a microphone thereof is capable of collecting sound wave directly or sensing vibration of vocal cords.

In order to realize abovesaid object, this invention is characterized in:

a neck hanger connected with one end of a microphone casing which is attached to a user's throat portion; two circuits housed in the microphone casing including a direct sound-receiver circuit and a circuit for sensing vibration of vocal cords; a switch controlled by a turnable slew cover on the microphone casing for switching between those two circuits alternatively; and a sound-receiver hole being driven to open or close by turning the slew cover to meet on-the-spot requirements.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE PREFERRED EMBODIMENT

Figure 1:
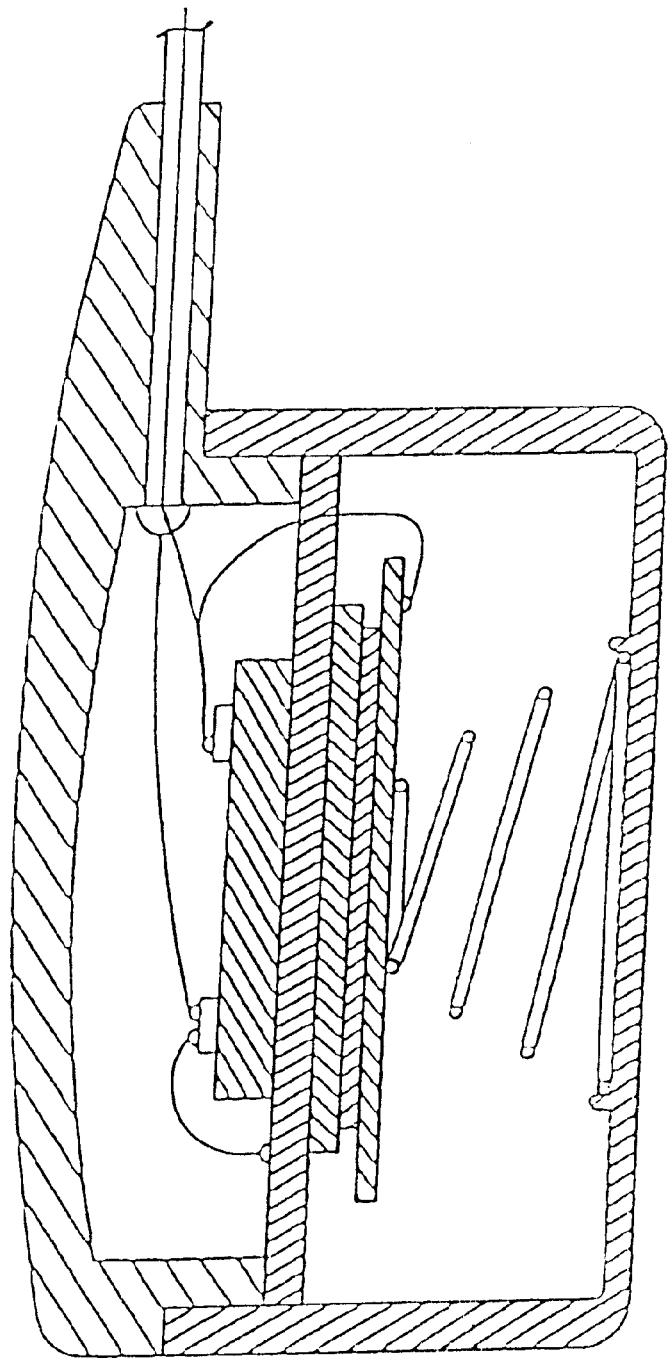
FIG. 1 is a schematic plane view of a conventional microphone assembly.
Figure 2:
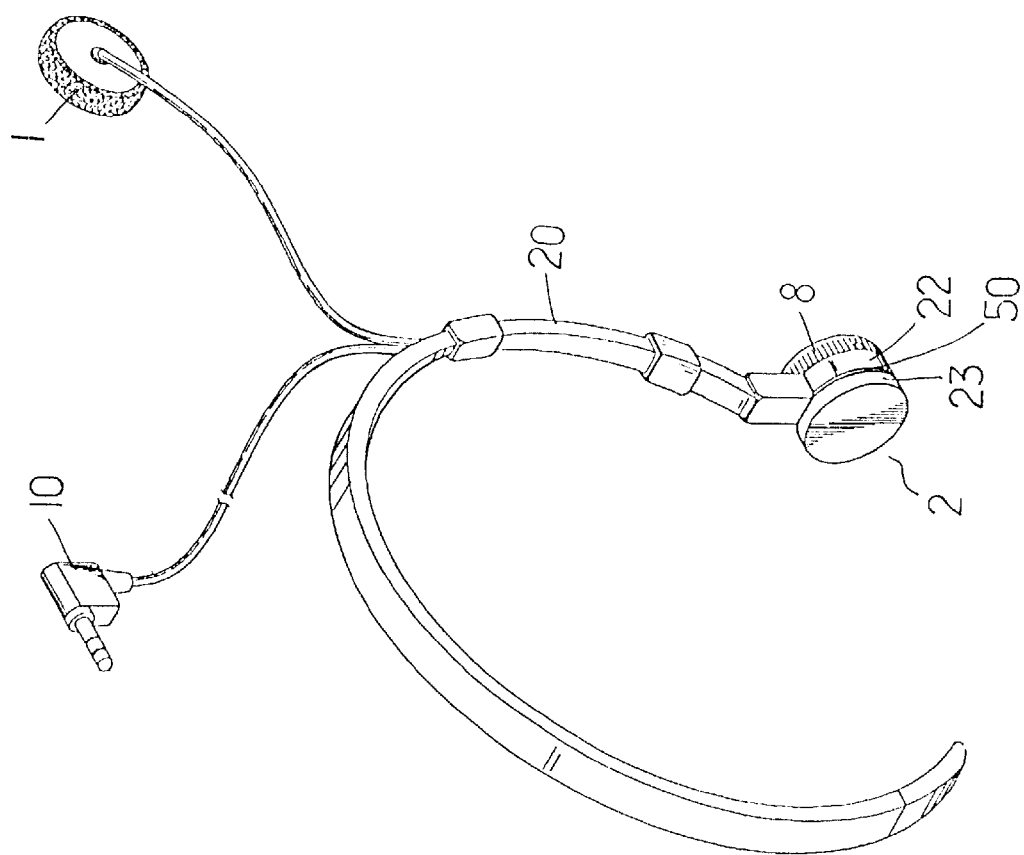
FIG. 2 is a schematic three-dimensional view of this invention.
Figure 3:
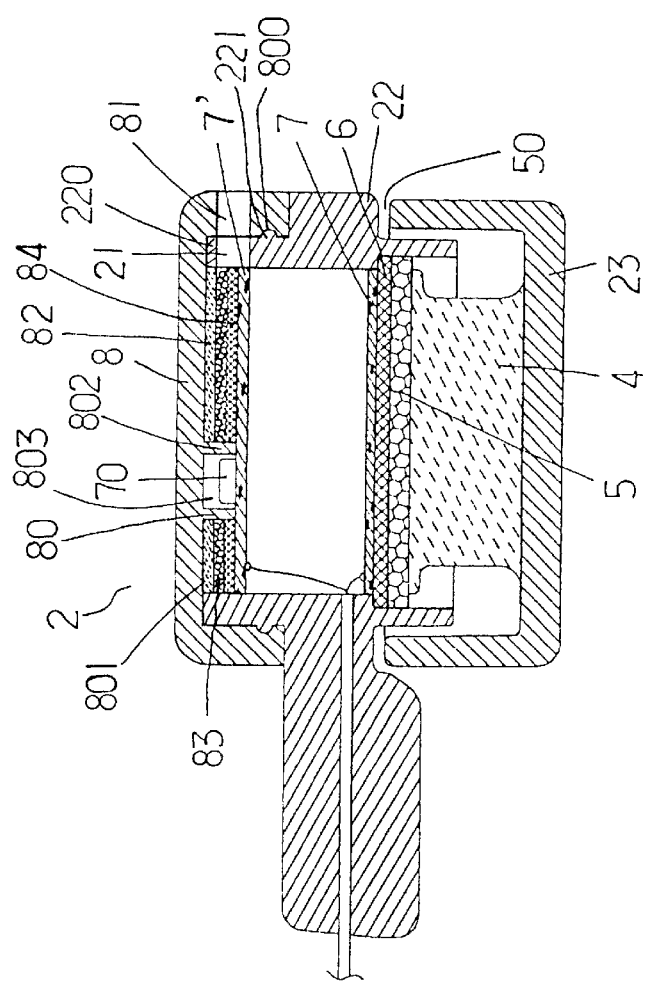
FIG. 3 is a cutaway sectional view of a microphone of this invention.

As illustrated in FIGS. 2 and 3, a double-functioned hand-free device for cellular telephone of this invention comprises an earphone 1, a plug 10, a microphone casing 2, and a neck hanger 20. The microphone casing 2 having one end connected with the neck hanger 20 is composed of an upper and a lower shell 22, 23, wherein the lower shell 23 is coupled to a sounding element 5, rubber-made element for example, through an interposed sponge body 4, and is separated from the upper shell 22 by a slit 50.

Figure 4:
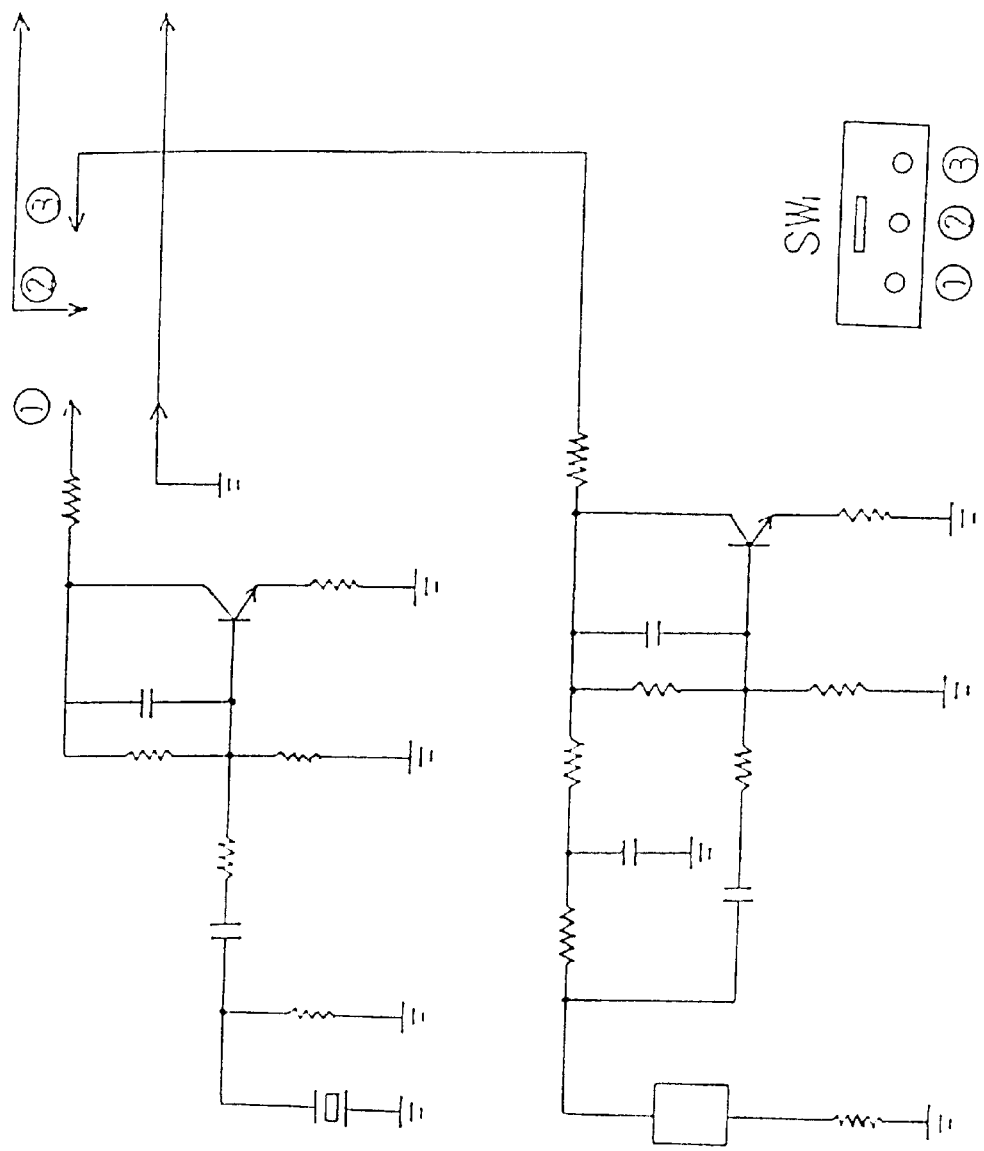
FIG. 4 is a sound-transmitter circuit of this invention.

Moreover, a damper layer 6 with a sound-transmitter circuit 7 attached thereon is resided on the sounding element 5 for secluding noise. The sound-transmitter circuit 7 (shown in FIG. 4) further comprises some known components or circuits, including a metallic conductive piece, an upper and a lower piezoelectric ceramic piece, a circuit board, an amplifier, etc, without needing reiteration here, and is communicable with a sound-receiver circuit 7' housed in a turnable slew cover 8 at the top end of the upper shell 22. The vibration-transmitter circuit 7 and the sound-receiver circuit 7' are controlled and selected by a switch 70.

A plurality of arcuate flanges 221 is disposed on a top edge 220 of the upper shell 22 oppositely for engaging with correspondent arcuate grooves 800 formed in the inner wall of the turnable slew cover 8, and a through hole 21 is perforated in the top edge 220 of the upper shell 22 above one of the arcuate flanges 221, wherein a recessed face 801 in the slew cover 8 is extended to form a left and a right stopper 80, 802 and a middle space 803 for positioning the switch 70, adjacent to the left end of the recessed face 801 according to FIG. 3.

A sound-receiver hole 81 is arranged at a lateral wall of the slew cover 8 corresponding to the through hole 21 in the upper shell 22 of the microphone casing 2 for secluding outside noise. Meanwhile, on the recessed face 801, from the upper end to the lower, a sponge layer 82, a sounding layer 83 (rubber-made for example), a damper layer 84 for secluding noise, and another sound-receiver circuit 7' are stepwise overlapped, wherein the switch 70 on the other sound-receiver 71 is interacted with and controlled by the stopper 80, 802 extended from the recessed face 801 of the turnable slew cover 8. (As the sound-receiver circuit 7' is composed of known components including a metallic conductive piece, an upper and a lower piezoelectric ceramic piece, a circuit board, an amplifier, etc, shown in FIG. 4, it won't be reiterated herein.)

Figure 5:
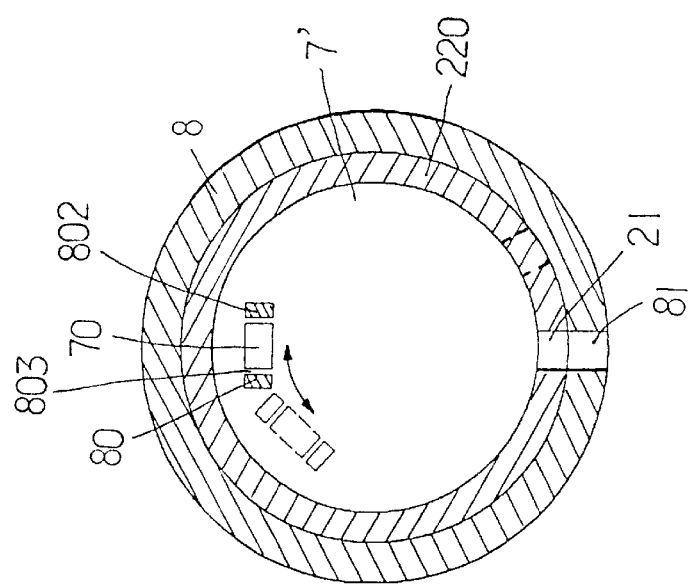
FIG. 5 is a schematic view showing that when a sound-receiver hole of the microphone of this invention is opened or closed.
Figure 6:
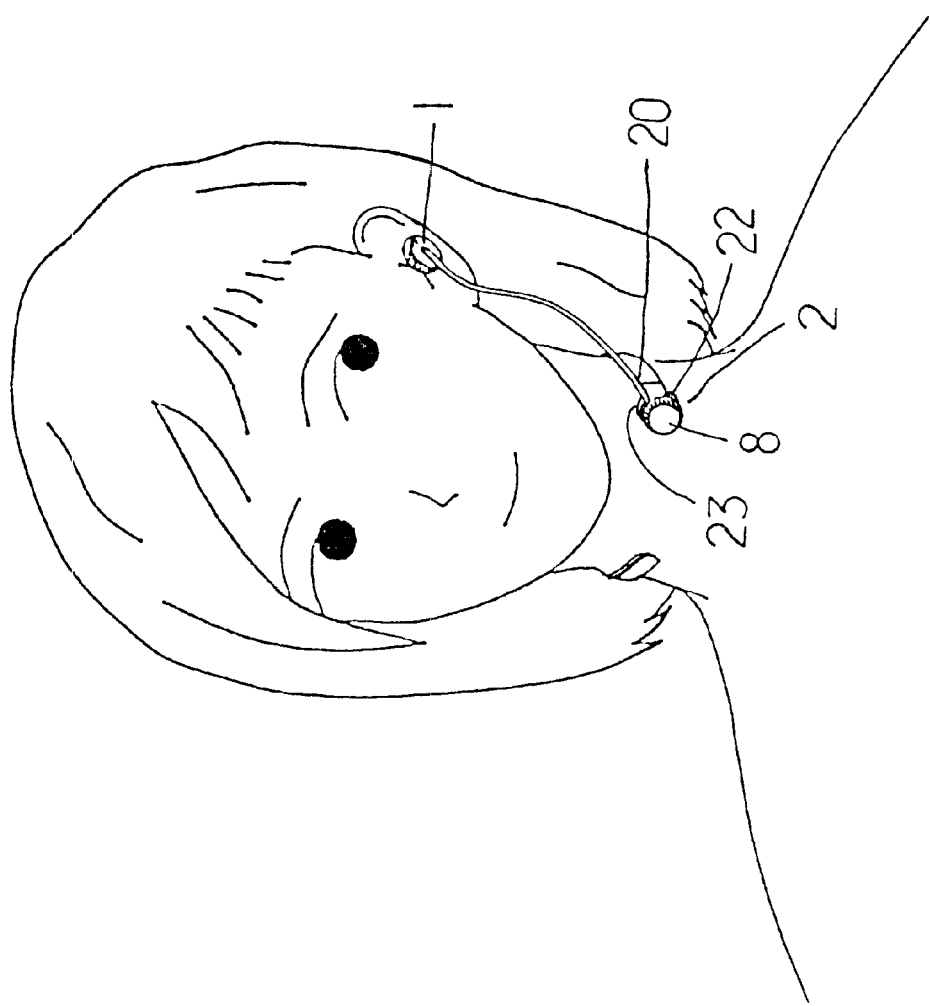
FIG. 6 is a disposition diagram of this invention.

After the neck hanger 20 is placed on his/her neck and the lower shell 23 of the microphone casing 2 is attached to his/her throat portion as shown in FIG. 6, the slew cover 8 is turned to have the switch 70 switched to select the vibration-transmitter circuit 7, and have the lower shell 23 closed and the sound-receiver hole 81 turned staggeringly to the through hole 21 in the upper shell 22 for secluding outside noise in the case sensing of vocal-cord vibration is desired. On the contrary, for direct sound-transmission, abovesaid operation is inverted to have the sound-receiver circuit selected, the sound-receiver hole 81 opened to link with the through hole 21 (shown in FIG. 5).

In short, the merits of this invention may be summarized as the following:

1. A double function for receiving both vibration wave and sound wave is endued to this invention for meeting different requirements.

2. The turnable slew cover is designed to drive the switch and open or close the sound-receiver hole for secluding outside noise if desired.

3. As the turnable slew cover is disposed on the microphone casing, it is particularly convenient for manipulative operation.

Although, this invention has been described in terms of preferred embodiments, it is apparent that numerous variations and modifications may be made without departing from the true spirit and scope thereof, as set forth in the following claims.

What is claimed is:

1. A double-functioned hand-free device for cellular telephone comprising:
   a microphone casing, comprising an upper and a lower shell, having one end connected to a neck hanger;
   a plurality of circuits housed in the microphone casing, including a direct sound-receiver circuit and a circuit for sensing vibration of vocal cords; and
   a switch controlled by an interactive stopper of a turnable slew cover, wherein the slew cover is disposed on the microphone casing for control opening or closing of a sound-receiver hole therein synchronously to permit it to communicate or not with a through hole of the microphone casing for direct sound-communication or vibration-transmission of vocal cords so as to meet on-the-spot requirements.

2. The double-functioned hand-free device for cellular telephone according to claim 1, wherein the upper shell and the slew cover are combined by jointing a plurality of arcuate flanges with corresponding arcuate grooves.

* * * * *